(12) United States Patent
Dawkins et al.

(10) Patent No.: US 6,178,445 B1
(45) Date of Patent: Jan. 23, 2001

(54) SYSTEM AND METHOD FOR DETERMINING WHICH PROCESSOR IS THE MASTER PROCESSOR IN A SYMMETRIC MULTI-PROCESSOR ENVIRONMENT

(75) Inventors: George John Dawkins, Austin; Van Hoa Lee, Cedar Park, both of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/052,456

(22) Filed: Mar. 31, 1998

(51) Int. Cl.$^7$ .......................... G06F 15/16; G06F 15/177
(52) U.S. Cl. .......................... 709/209; 709/221; 709/208; 709/222; 714/9; 714/13; 714/16; 713/1; 713/10; 713/2
(58) Field of Search .................................... 709/208, 209, 709/212, 221, 222; 712/31, 16; 345/502; 713/1, 10, 2, 100; 711/207, 150; 710/110; 399/77; 714/9, 13, 16, 31

(56) References Cited

U.S. PATENT DOCUMENTS

| | | | | |
|---|---|---|---|---|
| 4,580,232 | * | 4/1986 | Dugan et al. ........................... | 399/77 |
| 5,404,476 | * | 4/1995 | Kadaira ................................. | 711/207 |
| 5,418,955 | * | 5/1995 | Ikeda et al. ............................. | 713/1 |
| 5,530,946 | * | 6/1996 | Bouvier et al. ......................... | 714/23 |
| 5,764,882 | * | 6/1998 | Shingo ................................... | 714/11 |

OTHER PUBLICATIONS

IBM TDB "Method to Determine a Lead Processor in a Symmetric Multi–Processor System" vol. 39, No. 05, May 1996, pp. 53–54.*

IBM TDB Start–Up Master Processor Selection Method for Multi–Processor Systems, vol. 33, No. 4, Sep. 1990, pp. 375–376.*

* cited by examiner

Primary Examiner—Glenton B. Burgess
(74) Attorney, Agent, or Firm—Leslie A. Van Leeuwen

(57) ABSTRACT

A system and method for determining which processor is to be the master processor in a symmetric multi-processor (SMP) environment. The determination is made by boot-level code, i.e. the software program which executes first in a processor after it is brought on-line. Each processor in the SMP system is brought on-line independently of the other processors in the system, and each processor in the system can uniquely identify itself. As a processor comes on-line, it checks to see if a master processor has already been designated. If not, the processor checks to see if another processor, with a higher priority identifier, has identified itself as a working processor. If so, the processor commits to being a slave processor. If not, the processor indicates that it is available to be the master processor. A further check is made to ensure that only one processor has indicated that it is available to become the master processor. The likelihood that a particular processor will become the master processor may be increased or decreased by changing the processor's unique identifier. Thus, the system and method is controllable and changeable, without the need for any special or dedicated hardware. The probability that the system will always successfully select a master processor is increased, as is the probability that the system will initialize successfully even if one or more of the processors malfunctions.

12 Claims, 3 Drawing Sheets

SYSTEM AND METHOD FOR DETERMINING WHICH PROCESSOR IS THE MASTER PROCESSOR IN A SYMMETRIC MULTI-PROCESSOR ENVIRONMENT

FIELD OF THE INVENTION

The present invention relates to information handling systems, and, more particularly, to a system and method for determining which processor is to be the master processor in a symmetric multi-processor environment.

BACKGROUND OF THE INVENTION

In a symmetric multi-processor (SMP) system, a number of processors are connected together by means of a system bus. The system bus may be used by only one processor at a time. Other devices, such as storage and I/O devices, are also connected to the system bus. These devices, and other system resources, such as clocks, timers, direct memory access, and memory refresh controls, are shared by the processors.

During system reset, sometimes referred to as power-on-reset (POR), one of the processors is designated as the master processor. The master processor typically takes control of the system bus, and then initializes each of the other processors. The master processor also initializes the other devices in the system, and coordinates the starting of the entire system. For example, the master processor may test various parts of the system, such as memory areas. After system initialization, the master processor may designate a different processor as the master processor, or may remain the master processor. During operation of the system, the master processor may assign work to the other processors.

When a system is powered on, one of the processors is designated as the master processor. Prior art methods for determining which processor is to be the master processor are typically hardware-based methods, which can not be changed or controlled without making a hardware change. For example, in "Method to Determine a Lead Processor in a Symmetric Multi-Processor System," IBM Technical Disclosure Bulletin, Vol. 39, No. 05, May 1996, pp. 53–54, each processor has an equal chance to become the master. A system bus arbiter determines which processor is granted access to the bus in order to read a first access register. Thus, the master selection process can not be controlled or changed without changing the hardware.

Another prior art method, "Start-Up Master Processor Selection Method For Multi-Processor Systems," IBM Technical Disclosure Bulletin, Vol. 33, No. 4, September 1990, pp. 375–376, discloses a method based on start-up circuitry in a system resource unit. The start-up circuitry polls each processor sequentially in order to find the first processor capable of becoming the master. The master processor then informs the other processor units that they are slave processors. The master processor selection can only be controlled by changing the hardware wiring, as the master processor is always the first processor to be polled. Further, this method may not always result in a successful system initialization. If one of the processing units malfunctions, and fails to stop driving the Ready line, the start-up circuitry will never start, and the system will not come up.

Consequently, there is a need for a system and method for determining which processor is to be the master processor in an SMP environment. It would be desirable for the system and method to be controllable and changeable, without the need for any special or dedicated hardware. It would also be desirable to increase the probability that the system will always successfully select a master processor, and will initialize successfully even if one or more of the processors malfunctions.

SUMMARY OF THE INVENTION

Accordingly, the present invention is directed to a system and method for determining which processor is to be the master processor in a symmetric multi-processor (SMP) environment. The determination is made by boot-level code, i.e. the software program which executes first in a processor after it is brought on-line. Each processor in the SMP system is brought on-line independently of the other processors in the system, and each processor in the system can uniquely identify itself. As each processor comes on-line, it executes a series of steps. All processors in the system may be executing the steps concurrently.

As a processor comes on-line, it checks to see if a master processor has already been designated. If not, the processor checks to see if another processor, with a higher priority identifier, has identified itself as a working processor. If so, the processor commits to being a slave processor. If not, the processor indicates that it is available to be the master processor. A further check is made to ensure that only one processor has indicated that it is available to become the master processor. If the processor determines that more than one processor has indicated its availability to become the master processor, the processor de-commits, and returns to the step of checking to see if a master processor has already been designated.

The system and method of the present invention is controllable, and may be changed without changing the system hardware. Because each processor has a priority based upon its unique identifier, changes may be made by mapping each physical processor to a different logical identifier. The mapping may be stored in a non-volatile memory area.

An advantage of the present invention is that the likelihood that a particular processor will become the master processor may be increased or decreased by changing the processor's unique identifier. Thus, the system and method is controllable and changeable, without the need for any special or dedicated hardware. Another advantage of the present invention is that it increases the probability that the system will always successfully select a master processor, and will initialize successfully even if one or more of the processors malfunctions.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
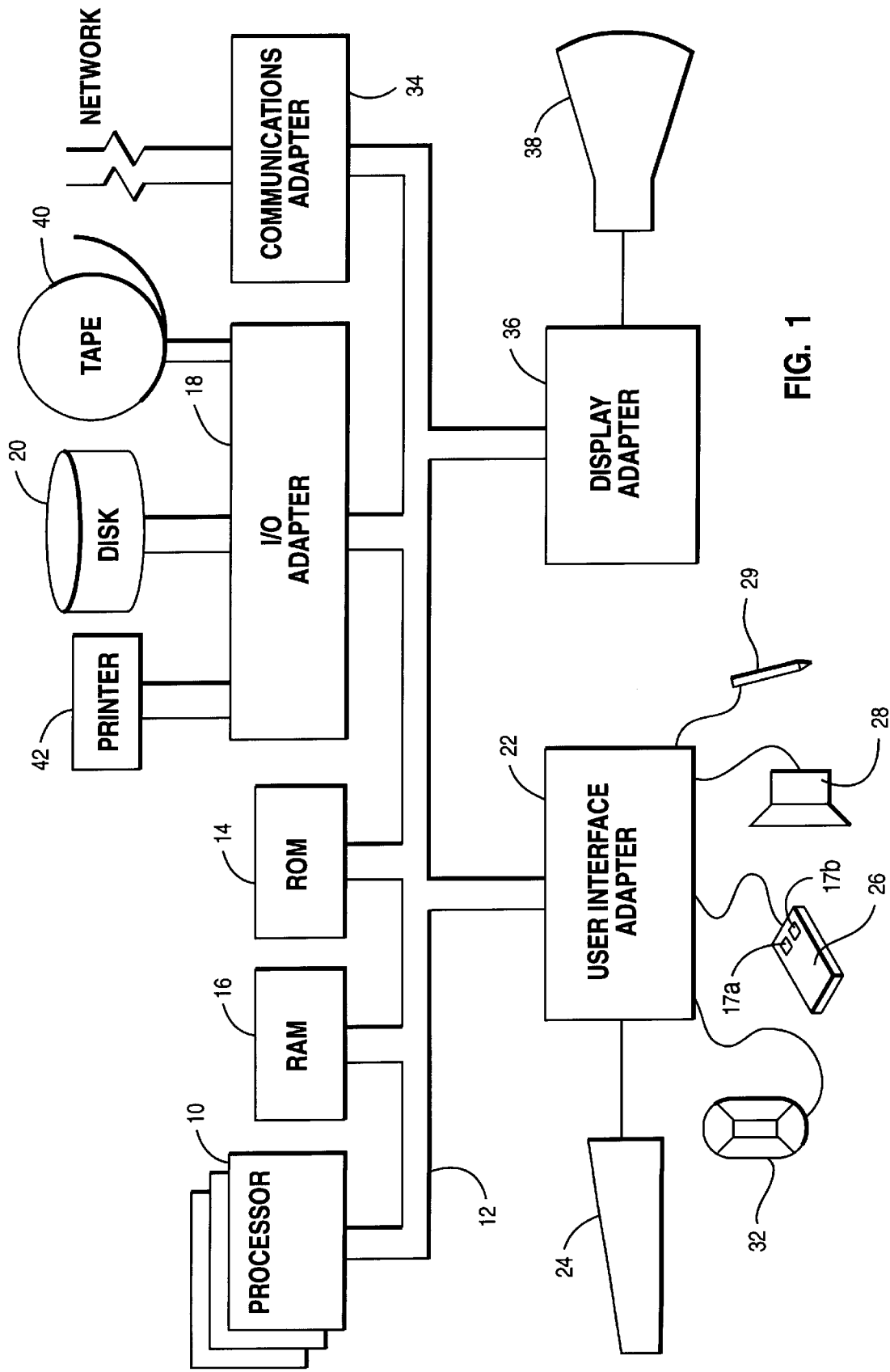
FIG. 1 is a block diagram of an information handling system capable of executing the method of the present invention.

The invention may be implemented on a variety of hardware platforms, including personal computers, workstations, embedded systems, mini-computers, and mainframe computers. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20 and tape drives 40 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38.

Communication adapter 34 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

The present invention is a system and method for allowing boot-level code to determine which processor is to be the master processor in a symmetric multi-processor (SMP) environment. Boot-level code is the software, or program, which executes first in a processor after the processor is brought on-line. Note that boot-level code is sometimes referred to as firmware or as Power-On-Reset (POR) code. Because the determination as to which processor is to be the master processor is made by the boot-level code, it is easier to change the determination than in prior hardware-based methods. As will be described below, with reference to FIGS. 4A and 4B, the determination as to which processor is most likely to become the master processor may be changed via software, and requires no specialized hardware or hardware changes. In addition, the present system and method will work with or without cache and memory coherency hardware, so long as a memory controller with consistency support is used.

The present invention may be implemented in an SMP system which includes any number of processors. The processors are brought on-line independently of each other. For example, they may be randomly released, or released at staggered intervals. Each processor can uniquely identify itself. As will be discussed below, with reference to FIGS. 4A and 4B, a processor's identity may be changed through the use of a mapping table. A number of contiguous memory cells, stored in RAM 16, are preferably used to implement the method of the present invention.

Figures 2, 4A, 4B:
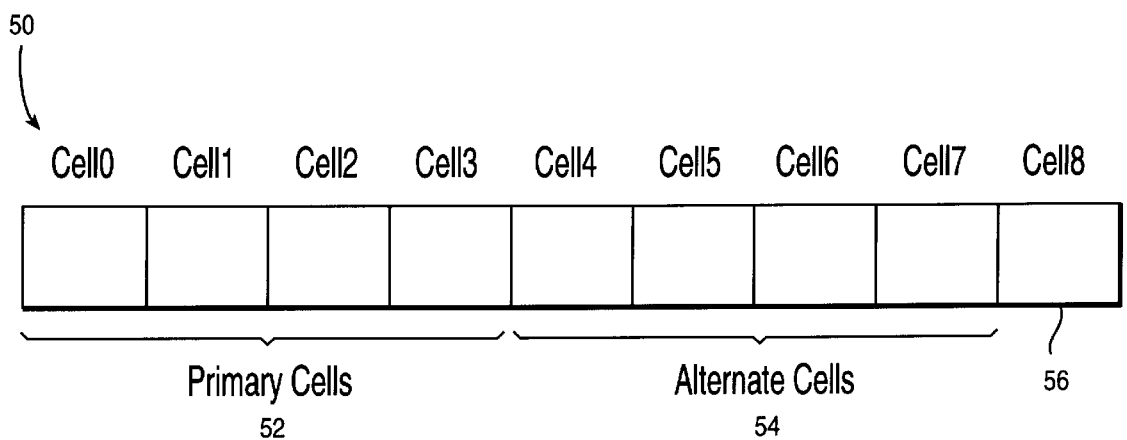
FIG. 2 is a block diagram depicting memory cells in a memory area of the information handling system of FIG. 1.
FIGS. 4A and 4B are block diagrams of a mapping table used to map physical processors to logical identifiers.

Referring now to FIG. 2, an example configuration of memory cells used to implement the present invention will be described. The number of memory cells used is (2n+1), where "n" is the number of processors in the SMP system. For example, if there are three processors in the system, seven memory cells are used. Similarly, if there are four processors in the system, nine memory cells are used. Note that a memory cell may be any defined memory area, such as a byte, half-word, word, etc., and the memory cells are preferably contiguous.

The example depicted in FIG. 2 includes nine memory cells 50 for use in an SMP system with four processors. Cell0, cell1, cell2, and cell3 are referred to as primary cells 52. Cell4, cell5, cell6, and cell7 are referred to as alternate cells 54. Cell8 is a global "master chosen" flag cell 56. When the system is powered on, a memory controller preferably initializes each of memory cells 50 to zero. Each processor in the system is associated with one primary cell 52 and one alternate cell 54. For example, processor 0 is associated with primary cell0 and alternate cell4. Processor 1 is associated with primary cell1 and alternate cell5, and so on.

Figure 3:
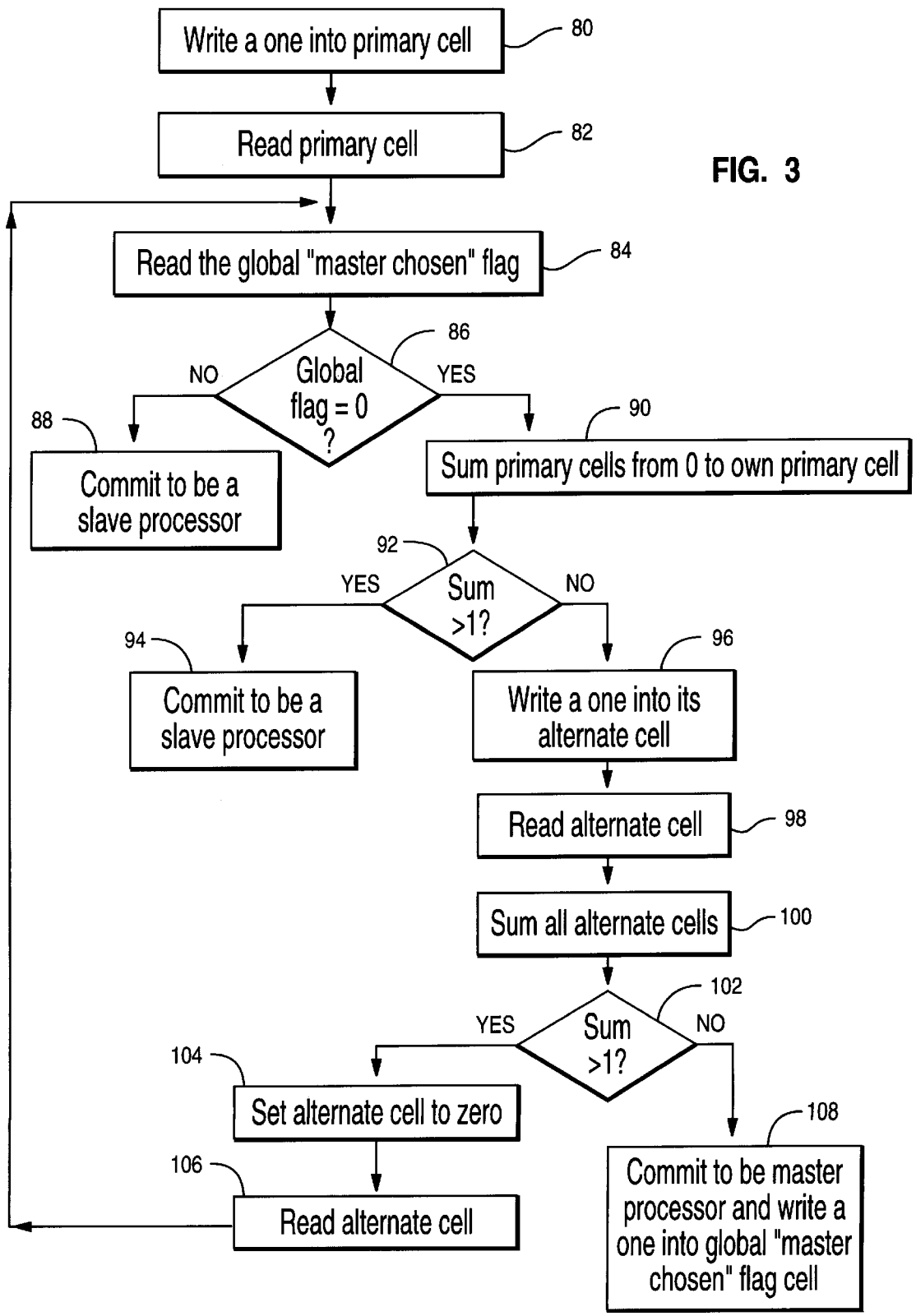
FIG. 3 is a flow chart illustrating a method for executing the present invention.

As each processor is brought on-line, it executes the steps depicted in FIG. 3. Note that each processor begins executing the steps as the processor is brought online. It is not necessary for one processor to complete execution of all the steps before another processor can start execution. Thus, as the processors come on-line, they will be concurrently executing the steps depicted in FIG. 3.

Referring now to FIG. 3, a method of implementing the present invention will now be described. When a processor comes on-line, it writes a one into its primary cell (step 80). For example, when processor 0 comes online, it writes a one into cell0. The processor then reads back its own primary cell to guarantee that the write has completed (step 82). A working processor is a processor which has successfully stored a value of one into its primary cell.

The processor next reads global "master chosen" flag cell 56 (step 84). If the value of flag cell 56 is not zero (step 86), the processor commits to being a slave processor (step 88), and is no longer involved in the master selection process. If, however, flag cell 56 is equal to zero (i.e. the answer to the question in step 86 is "yes"), the processor continues on in the master selection process. The processor next sums primary cells 52 from cell0 up to and including its own primary cell (step 90). For example, processor 2 would add together the contents of cell0, cell1, and cell2. The processor then determines if the sum is greater than one (step 92). If the sum is greater than one, this indicates that some other working processor has previously written to its primary cell. For example, if processor 2 obtains a result of two from summing cell0, cell1, and cell2, then this indicates that either processor 0 or processor 1 has previously written to its primary cell. Thus, the processor will commit to be a slave processor (step 94), and will no longer be involved in the master selection process. Note that steps 90 through 94 in effect assign a higher priority to lower numbered processors. In other words, if, during the summing of primary cells (step 90), a processor finds that a lower numbered processor has come on-line and is a working processor (i.e. has successfully written a one into its primary cell), the processor (which is a higher numbered processor) removes itself from the master selection process.

If the summing in step 90 results in a number which is not greater than one (i.e. the answer to the question in step 92 is "no"), then the processor continues on in the master selection process. The processor writes a one into its alternate memory cell (step 96). For example, in a four-processor system, processor 2 would write a one into cell6. The processor then reads its own alternate memory cell to ensure that the write completed (step 98). The processor then sums all the alternate cells (step 100). For example, in a four-processor system, processor 2 would add together the contents of cell4, cell5, cell6, and cell7. The processor then checks the result (step 102). If it is greater than one, the processor sets its alternate memory cell to zero (step 104), reads its alternate memory cell to ensure that the write has completed (step 106), and returns to step 84. If the sum is not greater than one (i.e. the answer to the question in step 102 is "no"), then the processor commits to be the master processor, and writes a one into global "master chosen" flag cell 56 (step 108).

The present invention insures that one processor, and only one processor, will become the master processor in an SMP system. As discussed above, with reference to steps 90 through 94 of FIG. 3, the present invention effectively assigns a higher priority to lower numbered processors. However, if the processor with the lowest number fails, another processor will become the master processor. Thus, the present invention increases the probability that the system will successfully select a master processor, and that the system will initialize successfully even if one or more of the processors malfunctions.

The system and method of the present invention is controllable, and may be changed without changing the system hardware. Because each processor has a priority which is based on its unique identifier, changes may be made by mapping each physical processor to a different logical identifier. The mapping may be accomplished via a table, or other known data structure. The mapping is preferably stored in a non-volatile memory area, such as non-volatile RAM.

For example, suppose that an initial mapping of a four processor system is as shown in FIG. 4A. As shown, physical processor 0 is identified as logical processor 0, physical processor 1 is identified as logical processor 1, physical processor 2 is identified as logical processor 2, and physical processor 3 is identified as logical processor 3. The method illustrated in FIG. 3 may use the logical identifiers for the processor numbers. In the example shown in FIG. 4A, each physical processor is mapped to the same logical identifier. Thus, if processor 0 is a working processor, it will most likely become the master processor, as preference is given to lower numbered processors.

If it is desired to have another processor be the master processor, the mapping table can be changed. An example is depicted in FIG. 4B. As shown in FIG. 4B, physical processor 0 is mapped to logical processor 2, physical processor 1 is mapped to logical processor 3, physical processor 2 is mapped to logical processor 0, and physical processor 3 is mapped to logical processor 1. In this example, physical processor 2 is most likely to become the master processor, so long as it is a working processor, because it has the lowest numbered logical identifier.

Exemplary pseudo-code for executing a method of the present invention is shown below.

Assumptions
1. The SMP supports n processors.
2. There are 2n+1 memory cells, beginning with cell 0.
3. Each processor has a unique identifier x, where 0<=x<=n−1.
4. Processor x owns two of the memory cells, namely cell number x and x+n.
5. Cells 0 through n−1 are primary cells.
6. Cells n through 2n−1 are alternate cells.
7. Cell number 2n is the global "master chosen" flag.
8. W(x,y,value) denotes a memory write by processor x to cell y with data "value."
9. R(x,y) denotes a memory read by processor x from cell y.
10. PRI_SUM(x)=R(x,0) for x=0, and R(x,0)+ . . . +R(x,x) for x>0.
11. ALT_SUM(x)=R(x,n)+ . . . +R(x,2n−1).
12. Each processor executes the steps below in the order given. However, one or more processors may be executing the steps at the same time.

Pseudo-code for each processor step
1. W(x,x,1); R(x,x);
2. If (0 != R(x,2n)) then goto "become_a_slave";
3. If (1 != PRI_SUM(x)) then goto "become_a_slave";
4. W(x,n+x,1); R(x,n+x);
5. If (1 == ALT_SUM(x)) then
   W(x,2n,1); R(x,2n);
   Else
   W(x,n+x,0); R(x,n+x); goto step 2;
   Endif Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for determining a master processor in an information handling system containing a plurality of processors, comprising the steps of:

assigning a logical identifier to each processor, wherein the logical identifier is unique for each processor, and wherein the logical identifier determines a priority for each processor;

bringing each processor on-line; and deciding, by each processor, in response to being brought on-line, if it is the master processor, wherein said deciding step includes the steps of:

indicating, by each processor, that it is functioning, wherein said indicating includes writing a first indicator into a first designated memory area, wherein each processor has a unique first designated memory area;

determining if the master processor has already been selected, wherein said determining includes checking a global flag;

if the master processor has not already been selected, determining if one or more higher priority processors is functioning, wherein said determining includes checking the first designated memory area of each higher priority processor;

if no higher priority processor is functioning, then committing to be the master processor, wherein said committing includes writing a second indicator into a second designated memory area, wherein each processor has a unique second designated memory area;

determining if one or more other processors has committed to be the master processor, wherein said determining includes checking the second designated memory area of each of the other processors;

if one or more other processors has committed to be the master processor, de-committing to be the master processor; and if no other processor has committed to be the master processor, indicating that the master processor has been determined, wherein said indicating includes setting the global flag.

2. A method according to claim 1, wherein said assigning step comprises the step of mapping a physical identifier for each processor to a corresponding logical identifier.

3. A method according to claim 2, wherein said mapping step further comprises the step of storing the physical identifier for each processor, along with the corresponding logical identifier, in a table.

4. A method according to claim 3, wherein the table resides in non-volatile random access memory.

5. A method according to claim 1, wherein said step of checking the first designated memory area of each higher priority processor further comprises the steps of:

if one or more higher priority processors has written the first indicator into its first designated memory area, then determining that a higher priority processor is functioning; and if no higher priority processor has written the first indicator into its first designated memory area, then determining that no higher priority processor is functioning.

6. A method according to claim 1, wherein said step of checking the second designated memory area of each of the other processors further comprises the step of:

if one or more other processors has written the second indicator into its second designated memory area, then determining that one or more other processors has committed to be the master processor.

7. A method according to claim 1, wherein said step of de-committing comprises the step of removing the second indicator from the second designated memory area.

8. An information handling system, comprising:

a plurality of processors;

means for assigning a logical identifier to each processor, wherein the logical identifier is unique for each processor, and wherein the logical identifier determines a priority for each processor;

means for bringing each processor on-line; and means for deciding, by each processor, in response to being brought on-line, if it is the master processor, wherein said means for deciding includes:

means for indicating, by each processor, that it is functioning, wherein said means for indicating includes means for writing a first indicator into a first designated memory area, wherein each processor has a unique first designated memory area;

means for determining if the master processor has already been selected, wherein said means for determining includes means for checking a global flag;

means for determining if one or more higher priority processors is functioning, wherein said means for determining includes means for checking the first designated memory area of each higher priority processor;

means for committing to be the master processor, wherein said means for committing includes means for writing a second indicator into a second designated memory area, wherein each processor has a unique second designated memory area;

means for determining if one or more other processors has committed to be the master processor, wherein said means for determining includes checking the second designated memory area of each of the other processors;

means for de-committing to be the master processor; and means for indicating that the master processor has been determined, wherein said means for indicating includes means for setting the global flag.

9. An information handling system according to claim 8, wherein said means for assigning comprises means for mapping a physical identifier for each processor to a corresponding logical identifier.

10. An information handling system according to claim 9, wherein said means for mapping further comprises a table for storing the physical identifier for each processor, along with the corresponding logical identifier.

11. An information handling system according to claim 10, wherein said table resides in non-volatile random access memory.

12. An information handling system according to claim 8, wherein said means for de-committing comprises means for removing the second indicator from the second designated memory area.

* * * * *